(12) United States Patent
Lemke et al.

(10) Patent No.: US 12,036,619 B2
(45) Date of Patent: Jul. 16, 2024

(54) HOISTABLE CUTTER

(71) Applicant: Ascent Helicopters Ltd., Parksville (CA)

(72) Inventors: Trent James Lemke, Parksville (CA); Scott Richard Burford, Errington (CA); Ryan Quinn Yip, Langley (CA)

(73) Assignee: Ascent Helicopters Ltd., Parksville (CA)

( * ) Notice: Subject to any disclaimer, the term of this patent is extended or adjusted under 35 U.S.C. 154(b) by 0 days.

(21) Appl. No.: 16/635,414

(22) PCT Filed: Aug. 3, 2018

(86) PCT No.: PCT/CA2018/050953
§ 371 (c)(1),
(2) Date: Jan. 30, 2020

(87) PCT Pub. No.: WO2019/023810
PCT Pub. Date: Feb. 7, 2019

(65) Prior Publication Data
US 2020/0171588 A1    Jun. 4, 2020

(30) Foreign Application Priority Data

Aug. 4, 2017   (CA) ................................ CA 2975547

(51) Int. Cl.
*B23D 33/02*        (2006.01)
*B23D 15/00*        (2006.01)
(Continued)

(52) U.S. Cl.
CPC ............. *B23D 33/02* (2013.01); *B23D 15/00* (2013.01); *B23D 35/005* (2013.01); *B26D 5/007* (2013.01);
(Continued)

(58) Field of Classification Search
CPC ........ B23D 33/02; B23D 17/06; B23D 15/14; B26D 5/007; H02G 1/02; H02G 1/005
(Continued)

(56) References Cited

U.S. PATENT DOCUMENTS 1,708,016 A  *  4/1929  Grunig .................. B60R 19/545
                                                              83/601
2,335,952 A     12/1943  Martin
                      (Continued)

FOREIGN PATENT DOCUMENTS

CN            106099755    *  11/2016  ............... H02G 1/02
WO      WO-2005023475 A1  *   3/2005  ........... B23D 15/145

OTHER PUBLICATIONS

Canadian Intellectual Property Office, International Search Report and Written Opinion in PCT/CA2018/050953, Oct. 30, 2018.

*Primary Examiner* — Evan H MacFarlane
(74) *Attorney, Agent, or Firm* — Wood Herron & Evans LLP

(57) ABSTRACT

A device for cutting an aerial obstacle includes a mounting frame; an anchor point for attachment to a hoist; a cutter mounted to the mounting frame, the cutter having opposing cutting blades for engaging and cutting the obstacle when positioned therebetween; a power supply mounted to the mounting frame, the power supply providing power to the cutter for actuating the cutting blades; and a guiding frame extending from the mounting frame, the guiding frame providing an inner guiding surface for directing the obstacle to a position between the opposing cutting blades of the cutter. The device is usable for cutting aerial obstacles, such as cables, beams and/or branches.

9 Claims, 5 Drawing Sheets

(51) Int. Cl.
  *B23D 35/00* (2006.01)
  *B26D 1/38* (2006.01)
  *B26D 5/00* (2006.01)
  *B26D 7/26* (2006.01)
  *H02G 1/02* (2006.01)

(52) U.S. Cl.
  CPC .................. *H02G 1/02* (2013.01); *B26D 1/38* (2013.01); *B26D 7/2614* (2013.01)

(58) Field of Classification Search
  USPC .......................................................... 30/233
  See application file for complete search history.

(56) References Cited

U.S. PATENT DOCUMENTS

| | | | |
|---|---|---|---|
| 3,670,648 A | 6/1972 | Cole et al. | |
| 3,915,043 A * | 10/1975 | Smith | B26D 5/38 |
| | | | 83/362 |
| 4,070,831 A * | 1/1978 | Rutz | B23D 15/14 |
| | | | 60/371 |
| 4,369,576 A * | 1/1983 | McVaugh | B23D 29/002 |
| | | | 30/228 |
| 4,407,467 A | 10/1983 | Emigh et al. | |
| 4,802,327 A * | 2/1989 | Roberts | A01D 34/866 |
| | | | 56/10.4 |
| 4,826,103 A | 5/1989 | McKown | |
| 5,083,517 A * | 1/1992 | Stevens | A01C 7/008 |
| | | | 111/100 |
| 5,139,006 A * | 8/1992 | Trudeau | B28D 1/222 |
| | | | 125/12 |
| 5,286,170 A | 2/1994 | Brannon | |
| 5,297,654 A | 3/1994 | De Forges De Parny et al. | |
| 8,079,293 B2 * | 12/2011 | Kortuem | E04D 13/178 |
| | | | 83/155 |
| 9,663,234 B1 * | 5/2017 | Hanlon | G06Q 10/083 |
| 9,694,904 B2 * | 7/2017 | Hirons | B64C 27/006 |
| 10,525,600 B2 * | 1/2020 | Bosscher | B26D 5/007 |
| 2008/0028619 A1 * | 2/2008 | Bubacz | B23D 35/001 |
| | | | 30/134 |
| 2018/0161890 A1 * | 6/2018 | Barezzani | B25B 27/14 |

\* cited by examiner

HOISTABLE CUTTER

This application claims priority to Canadian Patent Application no. 2,975,547, filed Aug. 4, 2017, which is herein incorporated by reference in its entirety.

FIELD OF INVENTION

The present invention relates generally to cutters. More specifically, the present invention relates to hoistable cutters for accessing and cutting remote sections of an aerial obstacle.

BACKGROUND

Hydro power lines and other such power and/or communication transmission lines often span long distances and traverse remote areas and/or rugged terrain which is difficult to access using ground vehicles. Such transmission lines may also span valleys or other terrain which presents a barrier for ground vehicles. In such cases, maintenance and/or decommissioning of transmission lines may be challenging, time consuming, and/or dangerous for ground personnel.

In certain cases, particularly where transmission lines and support structures have degraded, the structures may even be condemned, prohibiting ground personnel from performing maintenance and/or decommissioning operations using traditional ground-based equipment and techniques.

An alternative, additional, and/or improved device for cutting cables is desirable.

SUMMARY OF INVENTION

Provided herein are hoistable cutting devices which may be suspended from, for example, a crane or helicopter, thereby allowing cutting of aerial obstacles located in remote and/or difficult to access locations. In certain embodiments, during operation of the devices described herein, cutting forces may be substantially self-cancelling within the suspended equipment. Devices provided herein may include a guiding frame providing a guiding surface for funneling the obstacle to be cut into a location where the cutter can cut the obstacle, thereby facilitating engagement of the obstacle by the cutter, and simplifying operation of the device. Using such a configuration, devices herein may, in certain embodiments, be substantially self-centering upon the material to be cut, facilitating operation of the device.

In an embodiment, there is provided herein device for cutting an aerial obstacle, said device comprising:
  a mounting frame;
  an anchor point for attachment to a hoist;
  a cutter mounted to the mounting frame, the cutter having opposing cutting blades for engaging and cutting the aerial obstacle when positioned therebetween;
  a power supply mounted to the mounting frame, the power supply providing power to the cutter for actuating the cutting blades; and
  a guiding frame extending from the mounting frame, the guiding frame providing an inner guiding surface for directing the aerial obstacle to a position between the opposing cutting blades of the cutter.

In certain embodiments, the anchor point may be integrated with, or coupled to, the mounting frame.

In certain embodiments, the guiding frame and the mounting frame may be integrated, forming a continuous frame structure. In certain embodiments, the guiding frame and the mounting frame may be separate structures, with the guiding frame mounted to, or coupled with, the mounting frame.

In another embodiment of the above device, the cutter may be mounted to the mounting frame such that the opposing cutting blades of the cutter extend substantially downwardly from the mounting frame for unrestricted engagement of the aerial obstacle when the device is positioned above the obstacle.

In yet another embodiment of the device or devices above, the inner guiding surface of the guiding frame may be configured to substantially overlap inner cutting edges of the opposing cutting blades when the opposing cutting blades are in an open position, thereby providing a continuous path for the obstacle to access the position between the opposing cutting blades without catching.

In still another embodiment of the device or devices above, the guiding frame may include a lower supporting surface which provides a base for supporting the device in a substantially upright position when not in use.

In yet another embodiment of the device or devices above, the power supply may comprise an internal combustion engine.

In another embodiment of the device or devices above, the cutter may be a hydraulic cable cutter.

In yet another embodiment of the device or devices above, the hoist may be a hoist of a crane or a helicopter.

In still another embodiment of the device or devices above, the device may be configured for remote operation of the power supply by a user, allowing the user to remotely activate or deactivate the power supply.

In yet another embodiment of the device or devices above, the device may be configured for remote operation of the cutter by a user, allowing the user to remotely activate or deactivate the cutter.

In yet another embodiment of the device or devices above, the device may comprise a camera directed toward the opposing cutting blades of the cutter, the camera providing a video feed to a user, allowing the user to monitor operation of the cutter.

In another embodiment of the device or devices above, the device may further comprise a fail-safe release mechanism having an energy storing accumulator, which allows for opening of the cutting blades without further power input from the power supply.

In yet another embodiment of the device or devices above, the device may further comprise a protective cage surrounding the exterior of the device.

In another embodiment, there is provided herein a method for cutting an aerial obstacle, said method comprising:
  suspending any of the devices described above from a hoist above the obstacle to be cut;
  manoeuvering the device toward the obstacle such that the obstacle is directed by the guiding frame of the device to the position between the opposing cutting blades of the cutter of the device; and
  activating the cutter to cut the obstacle.

In another embodiment of the method above, the hoist may be a hoist of a helicopter or a crane.

In another embodiment, there is provided herein a method for cutting an aerial obstacle, said method comprising:
  suspending a cutting device from a hoist above the obstacle to be cut;
  manoeuvering the device toward the obstacle such that the obstacle is positioned between opposing cutting blades of a cutter of the device, with the opposing cutting blades centering on the obstacle to be cut; and activating the cutter to cut the obstacle, whereby cutting forces due to action of the opposing cutting blades are substantially self-cancelling during cutting.

In another embodiment of the method above, the cutting device may comprise a cutting device as described herein.

BRIEF DESCRIPTION OF DRAWINGS

These, and other features, aspects and advantages of the present invention will become better understood with regard to the following description and accompanying drawings, wherein.

DETAILED DESCRIPTION

Figure 1:
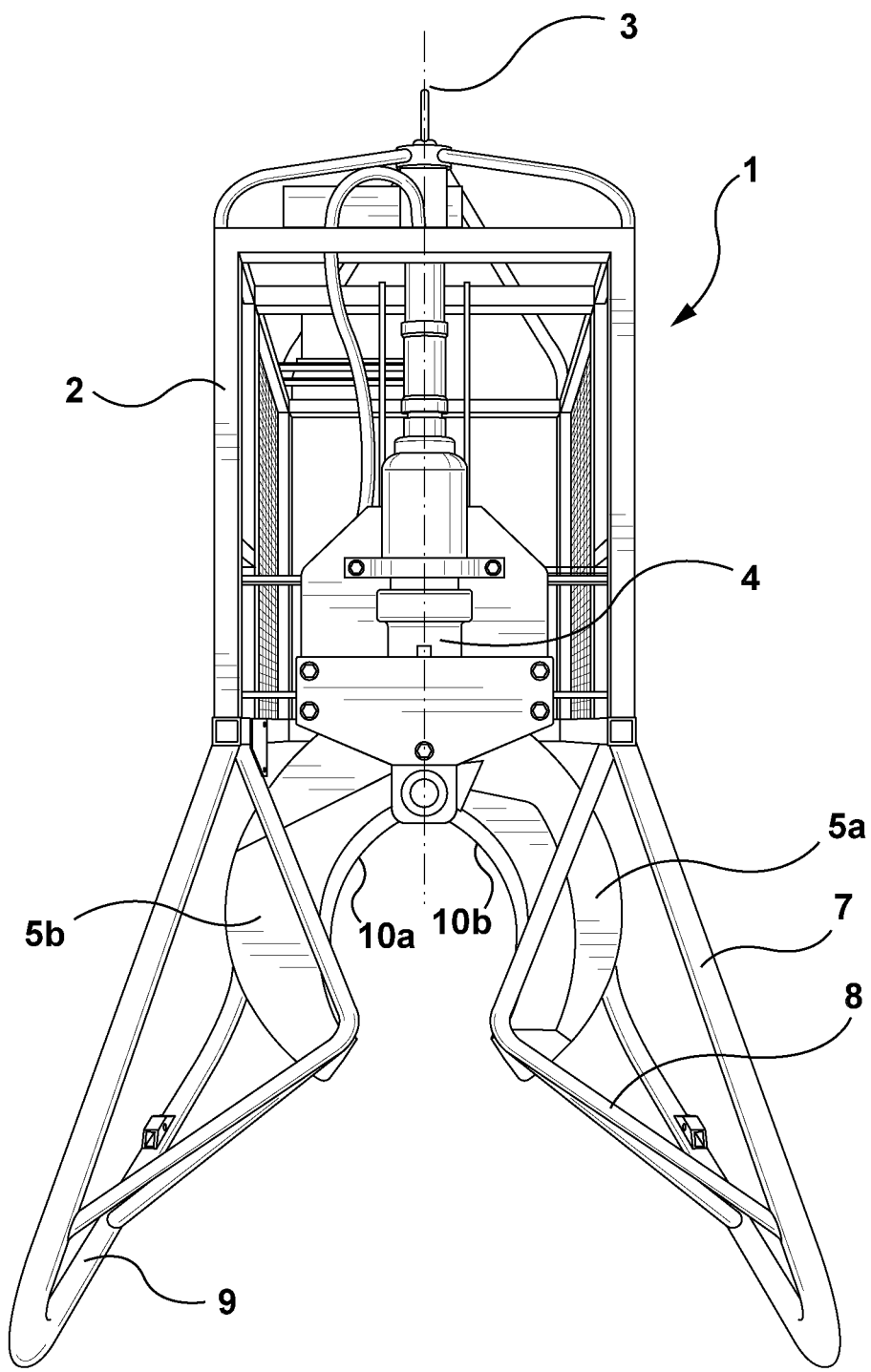
FIG. 1 shows a front perspective view of an embodiment of a device for cutting an aerial obstacle as described herein.

Described herein are cutting devices, and methods of use thereof. It will be appreciated that embodiments and examples are provided for illustrative purposes intended for those skilled in the art, and are not meant to be limiting in any way.

In an embodiment, there is provided herein a device for cutting an aerial obstacle, such as, but not limited to, a cable, beam, tree branch or other such cutting target, said device comprising:
  a mounting frame;
  anchor point for attachment to a hoist or suspension cable;
  a cutter mounted to the mounting frame, the cutter having opposing cutting blades for engaging and cutting the aerial obstacle when positioned therebetween;
  a power supply mounted to the mounting frame, the power supply providing power to the cutter for actuating the cutting blades; and
  a guiding frame extending from the mounting frame, the guiding frame providing an inner guiding surface for directing the obstacle to a position between the opposing cutting blades of the cutter.

In certain embodiments, the anchor point may be integrated with, or coupled to, the mounting frame.

In certain embodiments, the guiding frame and the mounting frame may be integrated, forming a continuous frame structure. In certain embodiments, the guiding frame and the mounting frame may be separate structures, with the guiding frame mounted to, or coupled with, the mounting frame.

As will be understood, the device is mainly used to cut cables (such as power or communications transmission cables, utility lines, and/or metal wire conductors); however, a variety of other aerial obstacles may be cut using such a device. By way of example, in certain embodiments wooden crossbeams, tree branches or other such structures may be cut using the device.

In certain embodiments, the mounting frame may comprise a steel frame or other suitable rigid support frame having a stabilized anchor point located at a centralized position at the top thereof. The anchor point may be used to attach the device to a hoist or suspension cable for raising the device to the aerial obstacle to be cut. By way of example, the anchor point may be used to attach the device to a hoist or a suspension cable extending from a crane or a helicopter. In certain further embodiments, a protective cage may be mounted to the mounting frame, whereby the protective cage surrounds the exterior of the device and protects the device from inadvertent impact and/or debris during operation.

In certain embodiments, the cutter of the device may comprise opposing cutting blades for engaging and cutting the target when the target is positioned therebetween. In certain embodiments, the cutter may comprise a shear-type cutter. As will be understood, the cutter of the device may be modified to suit the particular material being cut, and may in certain embodiments adopt alternative forms. For example, it is contemplated that, in certain embodiments, the cutting blades may be replaced by a saw blade, for example. As well, in certain embodiments, it is contemplated that cutters having designs which do not include opposing cutting blades may be used. For example, in certain embodiments, it is contemplated that a cutter having a single cutting blade which opposes a blunt member may be used, where the obstacle to be cut is easily cuttable.

In certain embodiments, by suspending the device from the anchor point, and providing the cutter with opposing cutting blades (or other cutter design) centering on the obstacle to be cut, cutting forces may be substantially self-cancelling within the suspended device during operation, protecting the helicopter and/or crane from undesirable torque/force which might otherwise make operation difficult.

In certain embodiments, the cutter may be mounted to the mounting frame such that the opposing cutting blades of the cutter extend substantially outwardly from the mounting frame for unrestricted engagement of the obstacle when the device is positioned in proximity to the obstacle. By way of example, the cutter may be mounted to the mounting frame such that the opposing cutting blades of the cutter extend substantially downwardly from the mounting frame for unrestricted engagement of the obstacle when the device is positioned above the obstacle.

As will be understood, the power supply of the device may comprise any suitable power source for operating the cutter. The power supply may include an electric power source, a mechanical power source, a hydraulic power source, or other suitable power source as will be known to the person of skill in the art having regard to the teachings herein. The power supply and the cutter may be configured such that the two are compatible and operable together. In certain embodiments, the power supply may comprise an internal combustion engine, which provides power to the cutter via hydraulics, for example.

In certain embodiments, the devices described herein may be configured for remote operation of the power supply by a user, allowing the user to remotely activate or deactivate the power supply. As well, in certain embodiments, the device may be configured for remote operation of the cutter by a user, allowing the user to remotely activate or deactivate the cutter. By way of example, the device may be configured to allow the pilot, co-pilot, or passenger of a helicopter to remotely operate the device. In certain circumstances, the device may comprise a camera directed toward the opposing cutting blades of the cutter, the camera providing a video feed to a user, allowing the user to monitor operation of the cutter.

In certain embodiments, a user (such as a helicopter pilot) may be provided with inputs for controlling the power supply (for example, a high pressure hydraulic system powered by a gas engine). Indicator lights may be provided to visually signal status of the device to the user. The device may be configured to allow a user to remotely restart the power supply (in this example, a gas engine unit) in the event that power is disrupted. In certain embodiments, pilot controls may be provided in the helicopter cockpit which may utilize new or pre-existing control buttons and/or may utilize an RF control FOB. As will be understood, remote control of the device may be accomplished using any suitable wired or wireless communications configurations known to the person of skill in the art, or any suitable combination thereof. Wired controls may, for example, utilize industry standards and/or common wiring existent on suspended lines below aircraft. Wireless controls may, for example, utilize RF signals, Wi-Fi signals, Bluetooth signals, or another suitable wireless control known in the art. In certain embodiments, the device may comprise a control unit operatively connected with the power supply, cutter, or both, which provides signals for controlling the operation thereof. In certain embodiments, the control unit may be housed in an environmentally sealed unit for protection for the elements. In certain embodiments, the control unit may house, for example, an RF remote engine start controller along with status indicator lights.

The person of skill in the art having regard to the teachings herein will be aware of a variety of wired and wireless configurations suitable for allowing remote operation of the devices described herein, and will be able to select a suitable configuration to suit a particular application.

As will be understood, failure of the power supply and/or cutter during operation while the cutter is engaged with the aerial obstacle, such as a cable, to be cut might result in a potentially hazardous situation whereby the device becomes entangled with the cable, for example. It is contemplated that in such situations, the helicopter may be freed from the obstacle to be cut by disengaging the device from the hoist or suspension cable of the helicopter (i.e. by cutting or releasing the suspension cable). Although the helicopter will be freed, the device may be left in a location from which retrieval may be difficult. As such, in certain embodiments, the devices described herein may further comprise a fail-safe mechanism for disengaging the cutter (i.e. returning the cutting blades to an open or disengaged position) in the event of power or operational failure.

By way of example, in certain embodiments, the device may comprise a fail-safe release mechanism having an energy storing accumulator, which allows for opening of the cutting blades without further power input from the power supply. By way of example, the power supply may comprise a hydraulic power unit including an internal combustion engine and providing about 10,000 PSI hydraulic pressure to electrically controlled valves, the cutter may comprise an actuator operating custom profiled cutting blades, and the fail-safe release mechanism may comprise a hydraulic energy storing accumulator.

As will be understood, in certain embodiments, the devices described herein may comprise a guiding frame extending from the mounting frame, the guiding frame providing an inner guiding surface for directing the aerial obstacle to a position between the opposing cutting blades of the cutter. In certain embodiments, the inner guiding surface of the guiding frame may be configured to substantially overlap inner cutting edges of the opposing cutting blades when the opposing cutting blades are in an open position, thereby providing a continuous path along which the obstacle may pass when accessing the position between the opposing cutting blades of the cutter without catching or snagging. In certain embodiments, the guiding frame and the mounting frame may be integrated, forming a continuous frame structure. In certain embodiments, the guiding frame and the mounting frame may be separate structures, with the guiding frame mounted to, or coupled with, the mounting frame. In other embodiments, the guiding frame could be integrated with the opposing cutting blades to funnel the aerial obstacle into the blades.

As will be understood, in certain embodiments, the guiding frame may comprise any suitable progressively narrowing structure which provides a large open end for initially targeting the aerial obstacle, and which progressively narrows toward the blades of the cutter to as to funnel the obstacle into a position at which the cutter may act. Where the cutter is positioned in a downward orientation extending below the device, the guiding frame may accordingly extend below the device and provide an inner guiding surface for directing the cutting target into the blades of the cutter. Using such a configuration, devices herein may, in certain embodiments, be substantially self-centering upon the material to be cut, facilitating operation of the device In certain embodiments of the devices herein, the guiding frame may include a lower supporting surface which provides a base for supporting the device in a substantially upright position when not in use. The guiding frame may thus act as a stand for supporting the device on the ground when the device is not in use, in storage, or during maintenance.

In another embodiment, there is provided herein a method for cutting an aerial obstacle, said method comprising:
suspending any of the devices described herein from a hoist or suspension cable above the obstacle to be cut;
manoeuvering the device toward the obstacle to be cut such that the obstacle is directed by the guiding frame of the device to the position between the opposing cutting blades of the cutter of the device; and
activating the cutter to cut the obstacle.

As will be understood, in certain embodiments of the above method, the hoist or suspension cable may be a hoist or suspension cable of a helicopter or a crane.

In yet another embodiment, there is provided herein a method for cutting an aerial obstacle, said method comprising:
suspending a cutting device from a hoist above the obstacle to be cut;
manoeuvering the device toward the obstacle such that the obstacle is positioned between opposing cutting blades of a cutter of the device, with the opposing cutting blades centering on the obstacle to be cut; and
activating the cutter to cut the obstacle, whereby cutting forces due to action of the opposing cutting blades are substantially self-cancelling during cutting.

In another embodiment of the method above, the cutting device may comprise a cutting device as described herein.

The devices and methods described herein will be even better understood by having regard to the following Example, which describes an illustrative and non-limiting exemplary embodiment of devices as contemplated herein.

EXAMPLE 1

Cable Cutting Device

Figure 2:
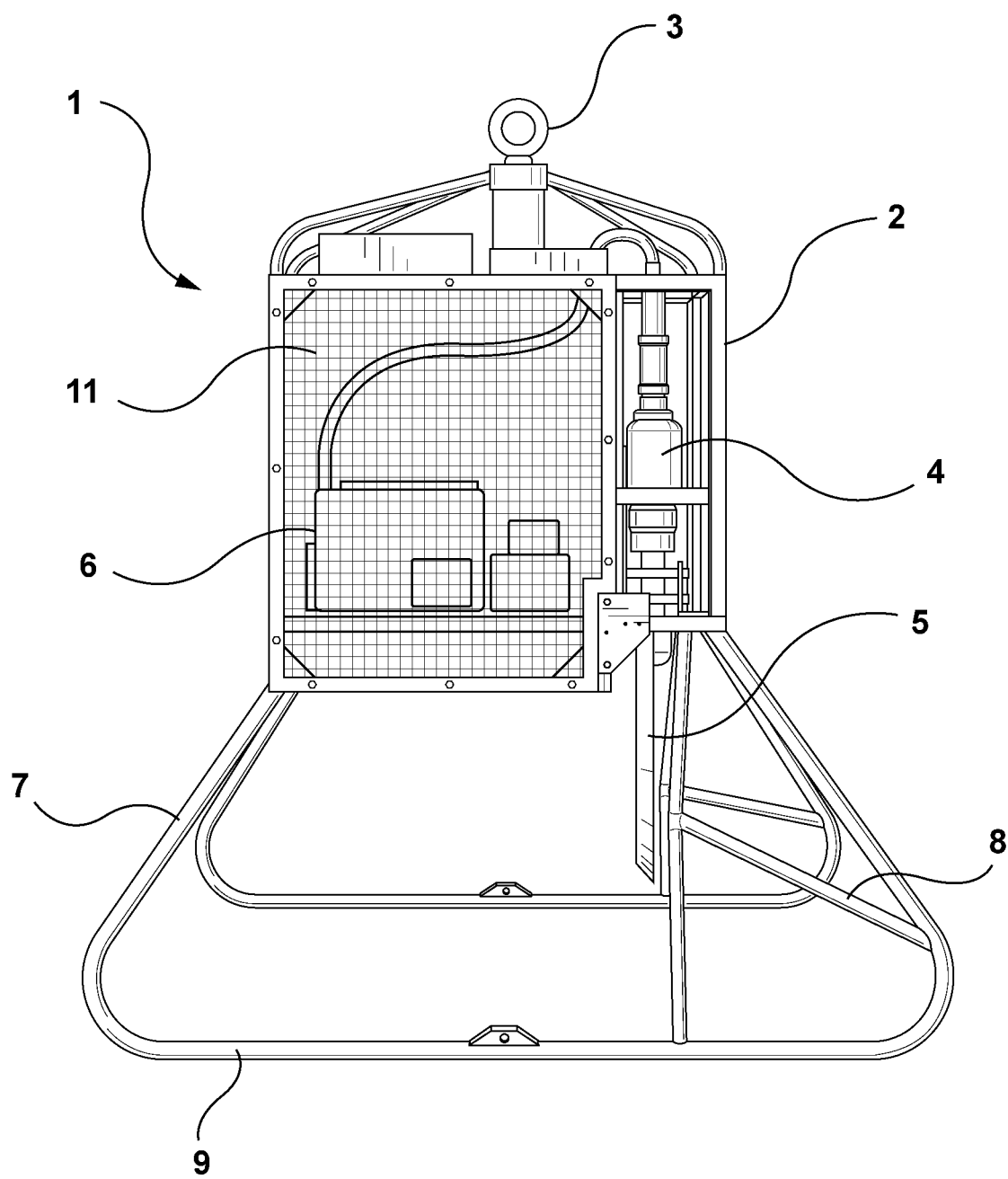
FIG. 2 shows a side perspective view of the embodiment of a device for cutting an aerial obstacle as shown in FIG. 1.
Figure 3B:
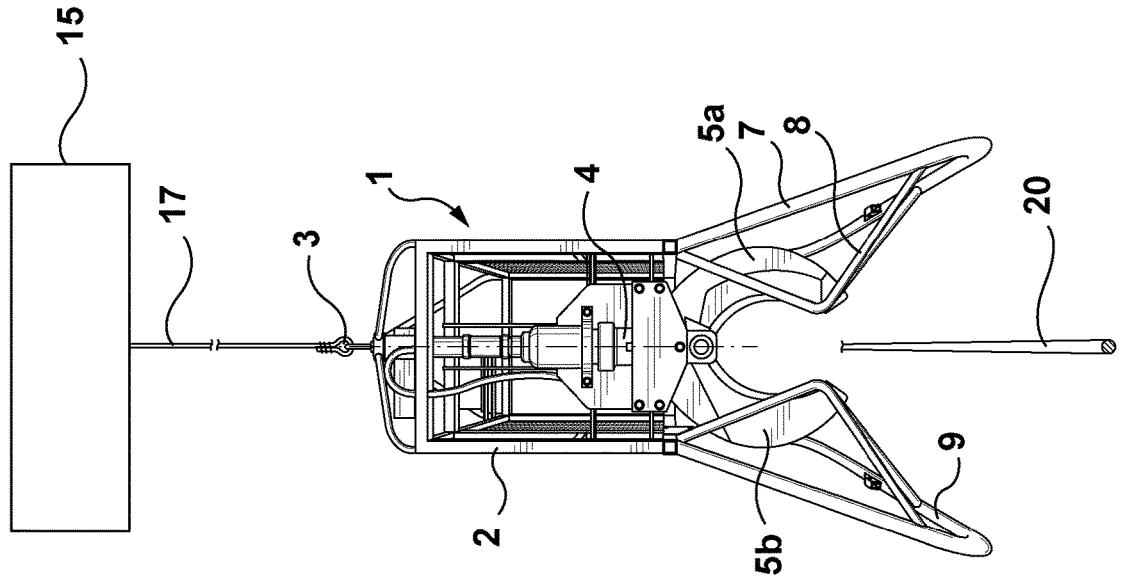
FIGS. 3A and 3B respectively show a front perspective view and a side perspective view of an embodiment of a device for cutting an aerial obstacle as described herein suspended from a helicopter above an aerial obstacle to be cut.
Figure 3A:
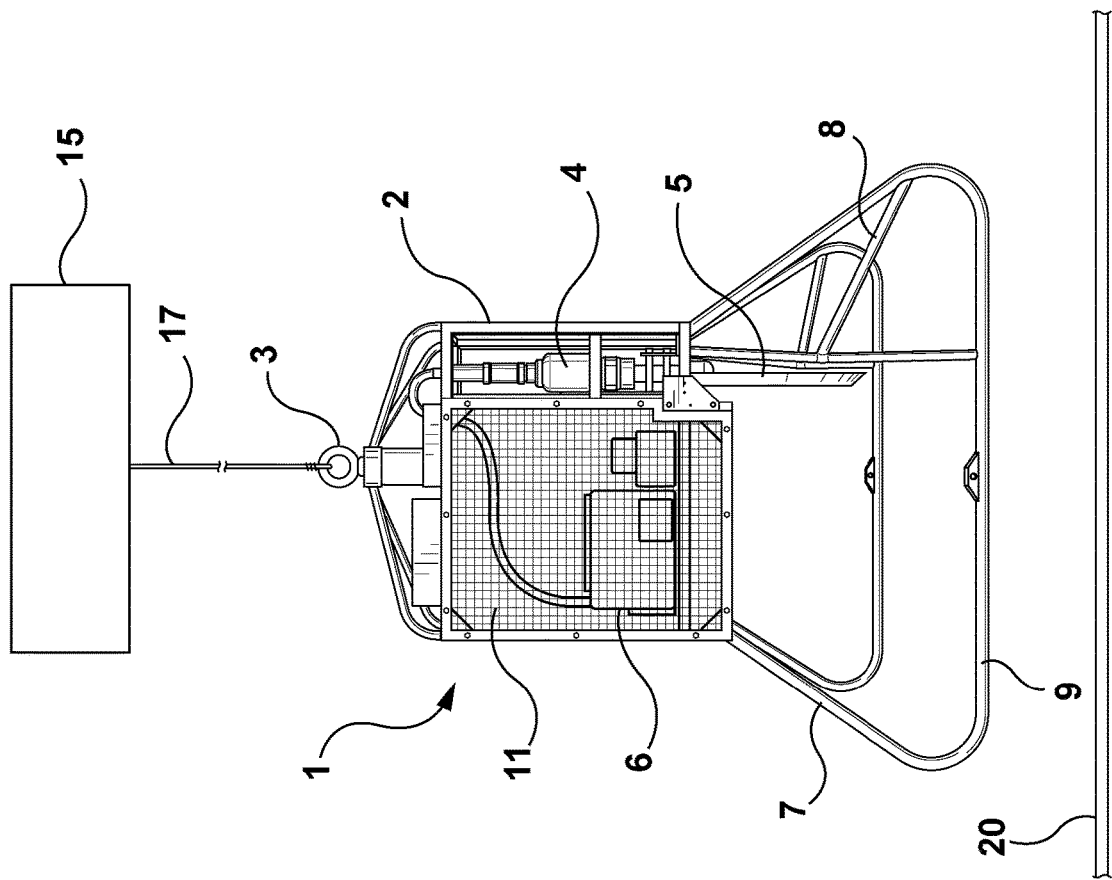
Figure 4B:
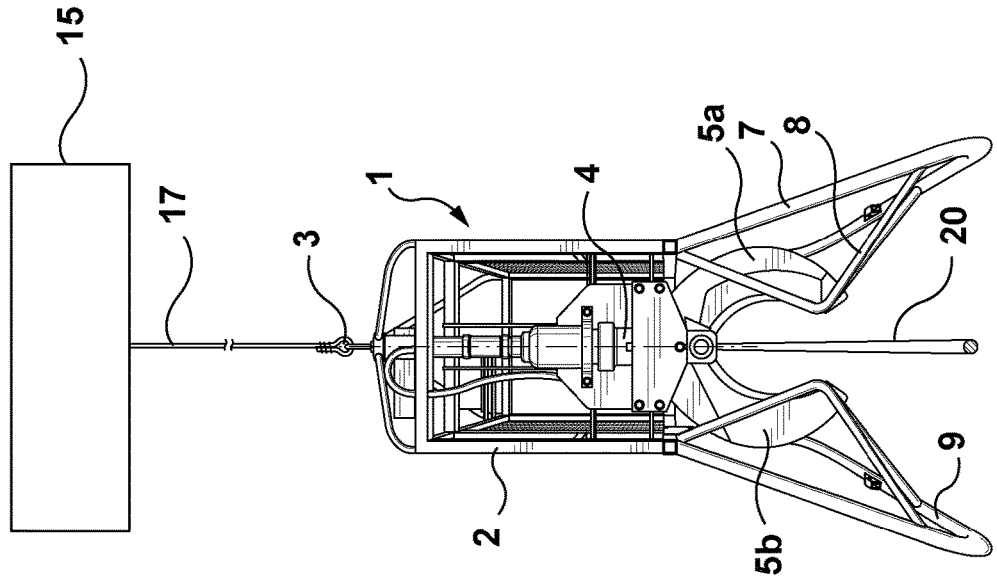
FIGS. 4A and 4B respectively show a front perspective view and a side perspective view of an embodiment of a device for cutting an aerial obstacle as described herein suspended from a helicopter with the aerial obstacle centered between the opposing cutting blades of the cutter of the device.
Figure 4A:
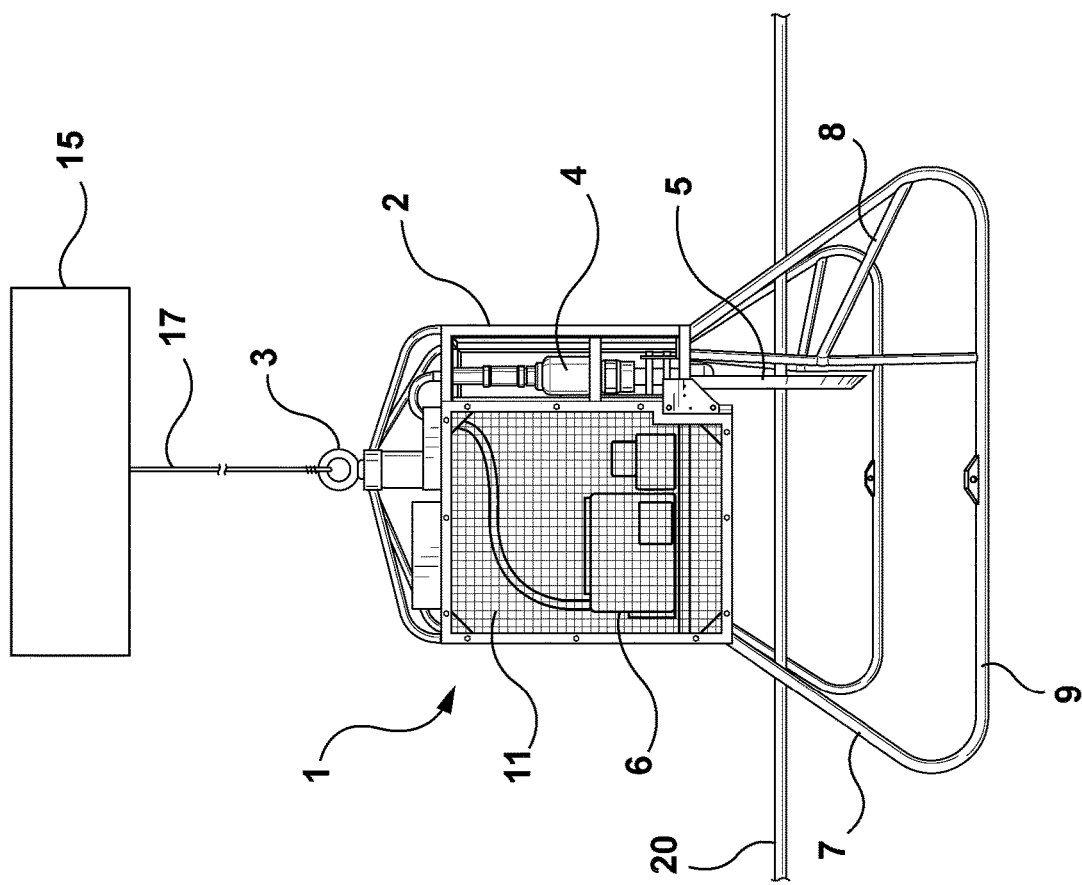
Figure 5A:
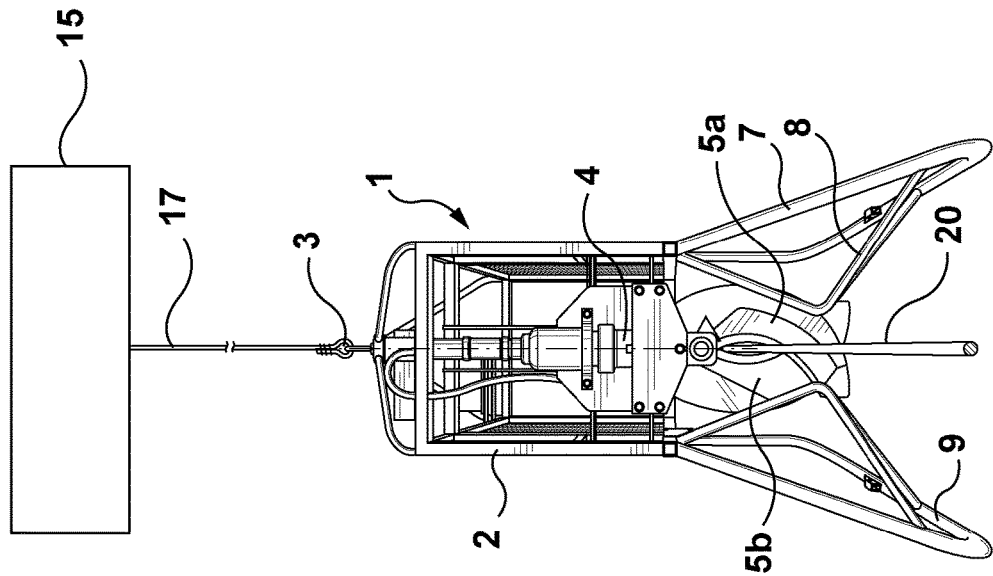
FIGS. 5A and 5B respectively show a front perspective view and a side perspective view of an embodiment of a device for cutting an aerial obstacle as described herein suspended from a helicopter with the aerial obstacle centered between the opposing cutting blades of the cutter of the device with the cutters in an activated position.
Figure 5B:
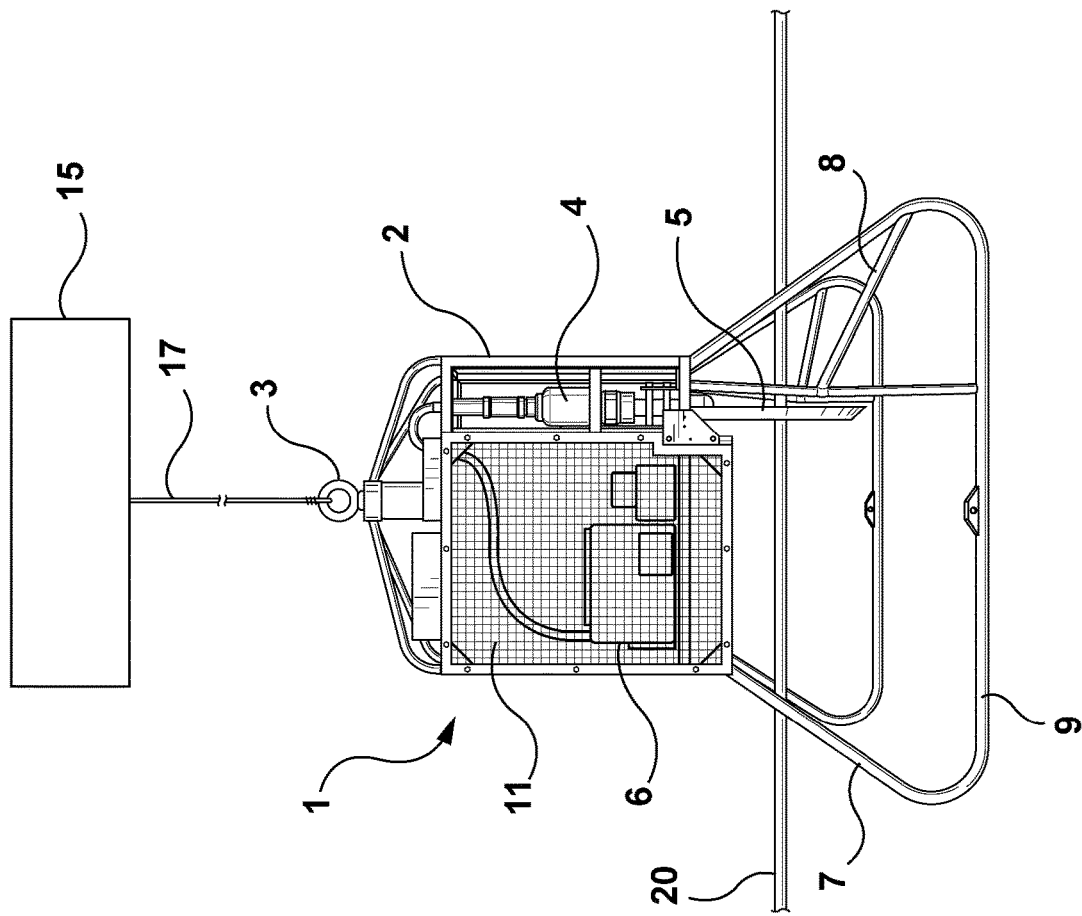

An example of a device for cutting an aerial obstacle is described in further detail below with reference to FIGS. 1, 2, 3A-B, 4A-B and 5A-B. For the sake of the present example, the device will be described with reference to a cable (20) as the aerial obstacle. However, as described above, cables are only but one of a number of examples of aerial obstacles that the device can be used to cut.

In this example, there is provided a cable cutting device for cutting hydro cables in remote or difficult to access locations. The exemplary device (1) comprises a mounting frame (2), with a stabilized anchor point (3) located at a centralized position at the top thereof. In this example, the anchor point is to be used for attaching the device to a hoist of a helicopter (15).

The exemplary device (1) further comprises a cable cutter (4) mounted to the mounting frame (2), the cable cutter having opposing cutting blades ((5a) and (5b), or generally (5)) for engaging and cutting the cable when the cable is positioned therebetween. In this example, the cable cutter is a hydraulic shear-type cable cutter.

The exemplary device (1) is further provided with a power supply (6) mounted to the mounting frame (2), the power supply (6) providing power to the cable cutter (4) for actuating the cutting blades (5). In this example, the power supply (6) comprises a hydraulic power unit including an internal combustion engine and providing about 10,000 PSI hydraulic pressure to electrically controlled valves, and the cable cutter (4) comprises an actuator operating custom profiled cutting blades (5).

The exemplary device further comprises a guiding frame (7) mounted to the mounting frame (2), the guiding frame (7) providing an inner guiding surface (8) for directing the cable to be cut to a position between the opposing cutting blades (5) of the cable cutter (4).

In the exemplary device (1), the cable cutter (4) is mounted to the mounting frame (2) such that the opposing cutting blades (5) of the cable cutter (4) extend substantially downwardly from the mounting frame (2) for unrestricted engagement of the cable when the device (1) is positioned above the cable. The inner guiding surface (8) of the guiding frame (7) is configured to substantially overlap inner cutting edges (10a, 10b) of the opposing cutting blades (5) when the opposing cutting blades are in an open position (see FIG. 1), thereby providing a continuous path for the cable to access the position between the opposing cutting blades (5) without catching. In the exemplified device (1), the guiding frame (7) includes a lower supporting surface (9) which provides a base for supporting the device in a substantially upright position when not in use.

The exemplified device (1) of this example is configured for remote operation of the power supply (6) by a user, in this case a helicopter pilot, allowing the user to remotely activate or deactivate the power supply (6). The exemplified device (1) of this example is also configured for remote operation of the cable cutter (4) by the user, allowing the user to remotely activate or deactivate the cable cutter. The device (1) of this example additionally comprises an optional camera directed toward the opposing cutting blades (5) of the cable cutter (4), the camera providing a video feed to a user, allowing the user to monitor operation of the cable cutter (4).

The device (1) of this example further comprises a fail-safe release mechanism having an energy storing accumulator, which allows for opening of the cutting blades (5) without further power input from the power supply (6), allowing disengagement of the cable cutter (4) (i.e. returning the cutting blades (5) to an open or disengaged position) in the event of power or operational failure.

The device (1) additionally comprises a protective cage (11) surrounding the exterior of the device (1) (see FIG. 2), protecting the device from inadvertent impact and/or debris during operation.

During operation, the exemplary device (1) may be suspended from a hoist or suspension cable (17) of a helicopter (15) and manoeuvered to a position above the cable (20) to be cut; then manoeuvered gradually toward the cable to be cut such that the cable to be cut is directed by the guiding frame (7) of the device (1) to a position between the opposing cutting blades (5) of the cable cutter (4) of the device (1); and then the cable cutter (4) may be activated to cut the cable to be cut.

One or more illustrative embodiments have been described by way of example. It will be understood to persons skilled in the art that a number of variations and modifications can be made without departing from the scope of the invention as defined in the claims.

What is claimed is:

1. A device for cutting an aerial obstacle, said device comprising:
   a mounting frame;
   an anchor point connected to the mounting frame for attachment to a hoist;
   a cutter mounted to the mounting frame, the cutter having opposing cutting blades for engaging and cutting the aerial obstacle when the aerial obstacle is positioned between the opposing cutting blades;
   a power supply mounted to the mounting frame, the power supply providing power to the cutter for actuating the opposing cutting blades; and
   a first guiding frame extending from the mounting frame, the first guiding frame including a first inner guiding surface for directing the aerial obstacle to a position between the opposing cutting blades of the cutter, where the first guiding frame further includes a first lower supporting surface at an end of the first guiding frame opposite the mounting frame;
   a second guiding frame extending from the mounting frame, the second guiding frame including a second inner guide surface for directing the aerial obstacle to the position between the opposing cutting blades of the cutter, where the second guiding frame further includes a second lower supporting surface at an end of the second guiding frame opposite the mounting frame;
   wherein the first inner guiding surface overlaps with a first cutting edge of the opposing blades when the opposing cutting blades are in an open position, wherein the second inner guide surface overlaps with a second cutting edge of the opposing cutting blades when the opposing cutting blades are in the open position, and wherein the first inner guide surface and the second inner guide surface provide a continuous path for the aerial obstacle to access the position between the opposing cutting blades without catching when the opposing cutting blades are in the open position; and wherein the first guiding frame and the second guiding frame project away from the mounting frame such that the first and second lower supporting surfaces are configured to rest on an underlying support surface to support the device in a substantially upright position when the device is not in use, and wherein the first and second guiding frames support the entirety of the weight of the device in the substantially upright position.

2. The device according to claim 1, wherein the cutter is mounted to the mounting frame such that the opposing cutting blades of the cutter extend substantially downwardly from the mounting frame.

3. The device according to claim 1, wherein the power supply comprises an internal combustion engine.

4. The device according to claim 1, wherein the cutter is a hydraulic cable cutter.

5. The device according to claim 1, wherein the anchor point is for attachment to a helicopter.

6. The device according to claim 1, further comprising a protective cage at least partially surrounding an exterior of the device.

7. A method for cutting an aerial obstacle, said method comprising:
   suspending the device according to claim 1 from the anchor point above the aerial obstacle; and
   activating the cutter to cut the aerial obstacle.

8. The method according to claim 7, wherein the anchor point is attached to a hoist of a helicopter.

9. A method for cutting an aerial obstacle, said method comprising:
   suspending the device according to claim 1 from the anchor point above the aerial obstacle;
   manoeuvering the device toward the aerial obstacle such that the aerial obstacle is positioned between the opposing cutting blades of the cutter of the device, with the opposing cutting blades centering on the aerial obstacle; and
   activating the cutter to cut the aerial obstacle, whereby cutting forces due to an action of the opposing cutting blades are substantially self-cancelling during cutting.

* * * * *